United States Patent [19]

Altmann

[11] Patent Number: 4,877,281
[45] Date of Patent: Oct. 31, 1989

[54] VEHICLE INTERIOR CARGO AREA LINER

[76] Inventor: Peter B. Altmann, 3111-6th Ave., Tacoma, Wash. 98406-6216

[21] Appl. No.: 151,519

[22] Filed: Feb. 2, 1988

[51] Int. Cl.⁴ .............................................. B62D 25/00
[52] U.S. Cl. .................................... 296/39.1; 220/404
[58] Field of Search ...................... 296/39 R; 105/423; 220/470, 402, 403, 404; 217/3 R; 493/93; 135/88, 105

[56] References Cited

U.S. PATENT DOCUMENTS

| | | | |
|---|---|---|---|
| 601,976 | 4/1898 | Murray | 296/39 R |
| 898,026 | 9/1908 | Wilson | 296/39 R X |
| 1,259,138 | 3/1918 | Sachs | 296/39 R |
| 2,128,978 | 9/1938 | Akin | 296/39 R X |
| 2,803,491 | 8/1957 | Brown | 296/39 R |
| 2,911,253 | 11/1959 | Dewey | 296/39 R |
| 3,168,101 | 2/1965 | Porter | 135/105 |
| 3,182,672 | 5/1965 | Biller, Jr. | 135/105 X |
| 3,951,284 | 4/1976 | Fell et al. | 296/39 R X |
| 4,077,418 | 3/1978 | Cohen | 135/95 |
| 4,186,845 | 2/1980 | Podd | 296/39 R X |
| 4,279,439 | 7/1981 | Cantieri | 105/423 X |
| 4,457,553 | 7/1984 | Larkin | 135/88 X |
| 4,461,402 | 7/1984 | Fell et al. | 296/39 R X |
| 4,657,299 | 4/1987 | Mahan | 296/43 R |
| 4,736,762 | 4/1988 | Wayman | 296/39 R X |
| 4,784,287 | 11/1988 | Yamada et al. | 220/403 |
| 4,792,239 | 12/1988 | Hamada et al. | 220/403 X |

Primary Examiner—Johnny D. Cherry
Assistant Examiner—Joseph D. Pape
Attorney, Agent, or Firm—James R. Vance

[57] ABSTRACT

The present invention comprises a protective liner for covering and protecting the interior surfaces of an enclosed or partially enclosed cargo area of a vehicle. The protective liner has a floor, walls, a roof, and possible a gate and/or rear cover. An opening is provided in the liner to allow easy access to the interior cargo area located within the liner. The opening of the liner may be closed by attaching the gate and/or rear cover.

14 Claims, 4 Drawing Sheets

VEHICLE INTERIOR CARGO AREA LINER

TECHNICAL FIELD

This invention relates to protective coverings for vehicle interiors. More specifically, the present invention relates to an easily erected and removable protective liner having a floor, walls, and a roof which cover and protect the interior surfaces of an enclosed or partially enclosed cargo area of a vehicle. An opening is provided at the one end of the liner to allow easy access to the interior cargo area located within the area defined by the erected liner. A gate and/or rear cover may be used to seal or partially seal the opening of the liner.

BACKGROUND ART

The need for various protective coverings for vehicle interiors have been widely recognized within the automotive industry. Car mats, which are intended to cover and protect interior carpet areas exposed to excessive wear, have been manufactured and used for many years. Seat covers which protect vehicle seats from soil are widely used. Protective padding to cover truck or van beds have also been developed.

DISCLOSURE OF INVENTION

It is a general object of the present invention to provide a liner capable of covering and protecting the interior surfaces of an enclosed or partially enclosed cargo area of a vehicle which would otherwise be exposed to soiling, unfavorable odors, or other damage, enabling the vehicle to haul a wide variety of objects without causing damage to the interior surfaces of the vehicle.

A further object is to provide a liner which covers and protects the bed, interior walls, front seats, rear door, and ceiling of the enclosed or partially enclosed cargo area of a vehicle.

A still further object is to provide a liner which may be used to contain and restrict movement of the contents of the cargo area, thereby, preventing such contents from entering the driving area or cockpit of the vehicle.

Another object is to provide an apparatus which is easily attached and removed from the vehicle.

Another object is to provide an apparatus which is easy to clean, is water-proof or water-resistant, is durable, and is tear-resistant.

The present invention is a liner which lines, covers, and protects the interior surfaces of a vehicle. The liner is particularly useful to cover and protect the interior surfaces of an enclosed or partially enclosed cargo area of a vehicle. The liner has a floor, walls, and a roof which are appropriately attached to one another along their corresponding edges to form a generally prismatic or parallelpiped container when the liner is erected. An opening is provided to allow easy access to the interior cargo area located within the liner. The opening of the liner may be completely or partially closed or covered by attaching a gate and/or a rear cover over the opening.

The interior framework of the vehicle serves to support the erected liner. Vehicle fasteners are attached to the interior surfaces of the vehicle at appropriate locations. Corresponding liner fasteners are attached to the liner. To erect the liner, the liner fasteners are removably secured to the vehicle fasteners. Thus attached, the interior framework of the vehicle supports the liner in an open upright position. The roof is preferably stretched taut between the interior walls of the vehicle near the ceiling of the vehicle. The walls of the liner hang down from the perimeter edges of the roof and are appropriately attached to the perimeter edges of the floor.

The floor lies upon, covers, and protects the bed of the vehicle's cargo area. The material defining the floor may extend part way up the sides of the walls.

A gate may be attached to the floor near the opening of the liner. When so attached, the gate may hang over the threshold of the door opening of the vehicle and hang over the bumper of the vehicle while the cargo is being loaded or unloaded within the liner. The gate may also be removably attached to the walls of the liner, thereby enabling the gate to be raised and serves as a tailgate for the liner. When so raised, the gate may serve to cover and protect the door of the vehicle.

As an alternative, or in addition, to the use of the gate, a rear cover may be attached to the roof near the opening of the liner. When so attached, the rear cover may serve as a canopy-flap, awning, rainfly, or storm flap for the opening of the liner. The rear cover may be used to repel moisture or dust from entering the cargo area during loading or unloading procedures. The rear cover also may be removably attached to the walls of the liner to completely or partially close, cover, or seal the opening of the liner preventing dust and odors from exiting the cargo area located within the liner.

BEST MODE FOR CARRYING OUT THE INVENTION

Figure 1:
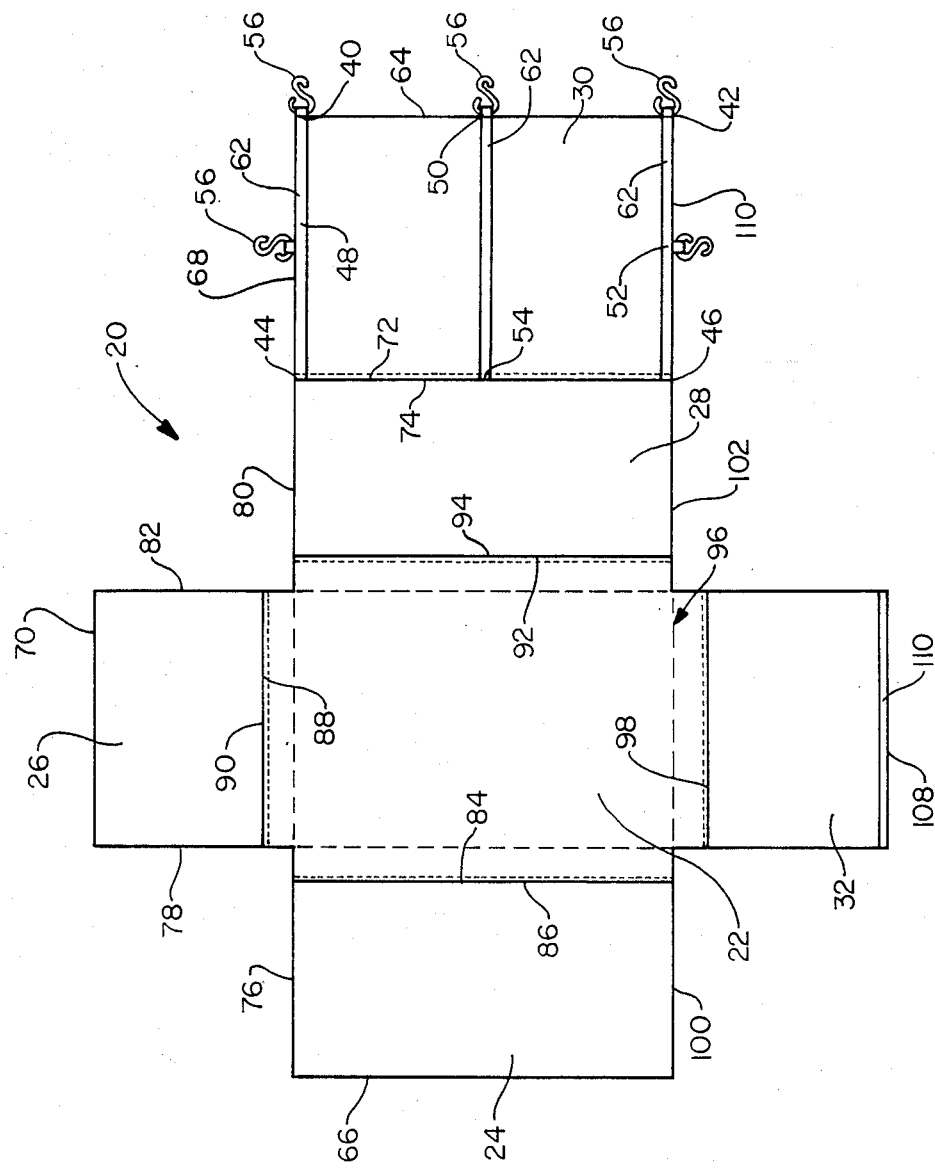
FIG. 1 is a plan view of the floor, left wall, front wall, right wall, roof, gate, and rear cover of this invention before these elements are gathered and secured to form the vehicle interior cargo area liner.
Figure 2:
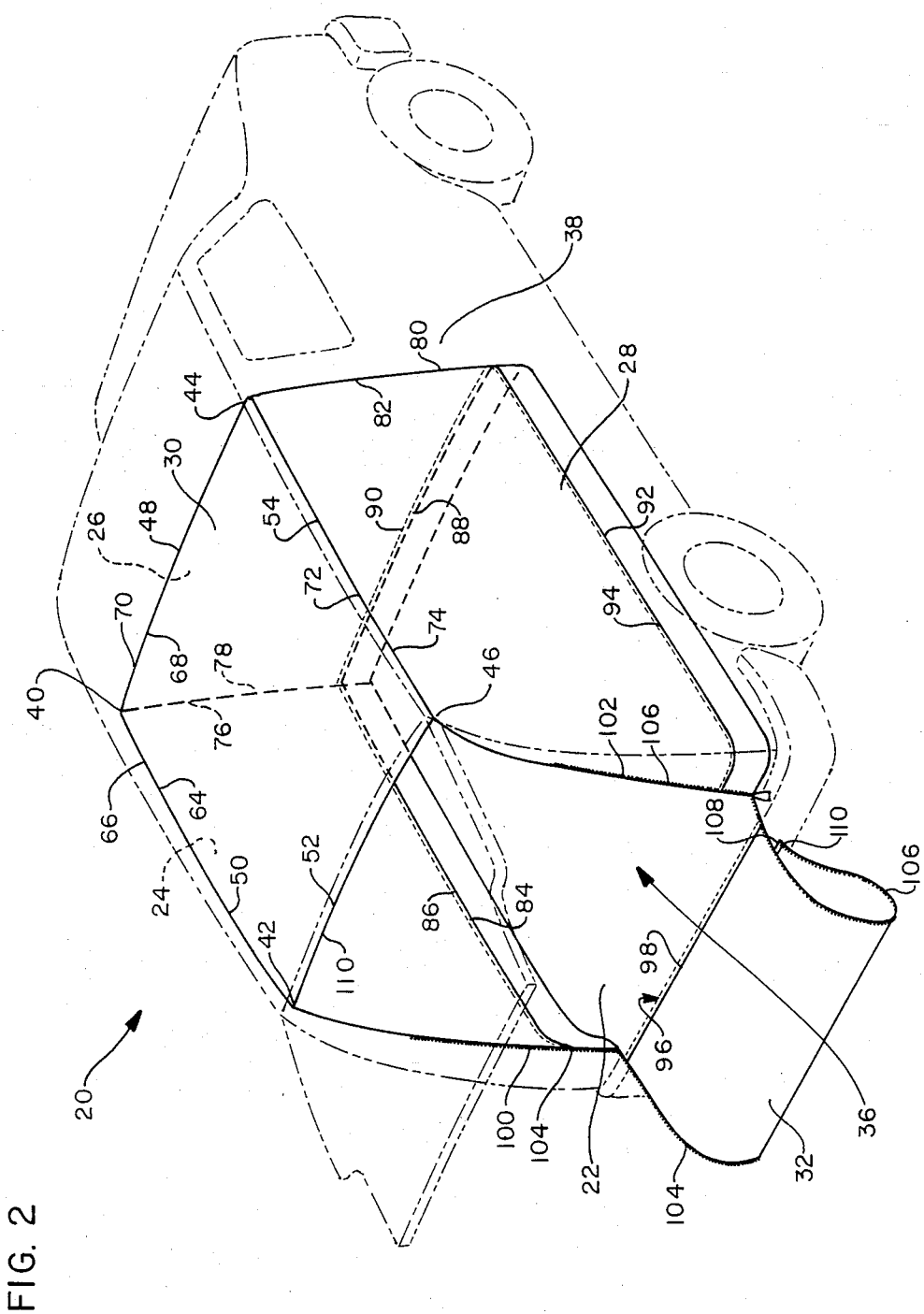
FIG. 2 is a perspective view of the liner, shown in solid lines, installed within a vehicle, shown in dashed lines, with the gate lying over the rear threshold and bumper of the vehicle.

Referring to the drawings and particularly to FIGS. 1 and 2, wherein like numerals indicate like parts, the vehicle interior cargo area liner 20 is designed to line, cover and protect the interior surfaces of an enclosed or partially enclosed cargo area of a vehicle. Liner 20 enables the vehicle to be used to haul a wide variety of items without exposing the interior surfaces of the vehicle to soiling, unfavorable odors, or other damage. As shown in FIG. 2, liner 20 is designed to cover and protect the bed, interior walls, front seats, and ceiling of the vehicle. Liner 20 may cover and protect the rear door, rear threshold, and bumper of the vehicle. Liner 20 also serves to contain and restrict the movement of the contents stored within the cargo area, preventing such contents from entering the driving area or cockpit of the vehicle. To accomplish these purposes, liner 20 has a floor 22, a left wall 24, a front wall 26, a right wall 28, and a roof 30. Liner 20 may also have a tongue or gate 32 and/or a rear cover 34 (shown in FIG. 1). As indicated in FIG. 2, an opening 36 is provided near the aft end of liner 20 allowing easy access to the interior cargo area located within liner 20. Where the vehicle is a van or truck, opening 36 is appropriately dimensioned to permit full use of the usually wide, door opening of the vehicle. Opening 36 may be closed by various means including but not limited to attaching gate 32 and/or rear cover 34 to liner 20.

As shown in FIG. 2, the interior framework 38 of the vehicle, which defines the enclosed or partially enclosed cargo area, forms the exterior "skeleton" or support frame to which liner 20 is attached. Consequently, the shape of liner 20 when installed within the vehicle is generally a parallelpiped, prism, prismatoid, or prismoid. Framework 38 provides the structural integrity of liner 20, thereby keeping liner 20 in a firmly upright position during use. Liner 20 is supported at upper corners 40, 42, 44 and 46, and at midsection points 48, 50, 52, and 54 by liner fasteners 56, shown in FIG. 4, which attach to corresponding vehicle fasteners 58 secured, also shown in FIG. 4, to the interior surfaces of the vehicle. Fasteners 56 and 58 will be discussed in detail below.

At first glance, liner 20 has a very rough appearance of being a right rectangular, box tent structure erected within the confined or partially confined space of the cargo area of a vehicle. The dimensions of liner 20 will vary depending the size of the cargo compartment desired to be covered and protected. Where the shape of liner 20 is a parallelpiped, prism, prismatoid, or prismoid, the cost of manufacture are reduced by the simplicity of the design.

An additional feature of the present invention is an independent structural frame which could be used to replace framework 38 of the vehicle. The independent structural frame allows liner 20 to be independently erected inside of the vehicle or outside of the vehicle for use as a tent structure. As shown in FIG. 1, floor 22, left wall 24, front wall 26, right wall 28, roof 30, and gate 32 are formed from large sections of fabric or other material. Each of these elements may be manufactured separately and then joined together to form liner 20. Alternatively, a plurality of these elements may be formed from a single continuous piece of fabric or material.

Liner 20 is preferably made of material which is light, durable, and tear-resistant. Many nylon fabrics have these features and are mildew-resistant as well. Liner 20 may also be made of canvas, cotton, polyester, plastic, or other suitable fabric, material, or combination of materials. In the preferred embodiment, roof 30, left wall 24, front wall 26, right wall 28, and gate 32 are made of a nylon reinforced polyethelene material sold under the trademark EVA. Floor 22 is made of a vinyl coated PVC nylon base fabric sold under the trademark Rhino-Tex. The material used may incorporate a variety of colors to make liner 20 aesthetically appealing.

The material used for floor 22 should be able to withstand abrasion. For durability, the material used should have at least a thickness of 0.0004 inches (4 mils).

Liner 20 may be made of water-proof or water-resistant material, or be treated to become so. Preferably, floor 22 is of water-proof material which can hold and contain any spills which possibly could occur within the cargo area enclosed by liner 20.

The materials used may also be treated with a flame-retardant or flame-resistant substance to prevent or minimize damage to liner 20, the vehicle, and the occupants of the vehicle should a spark, lit cigarette, or other similar hazard land on liner 20.

Figure 3:
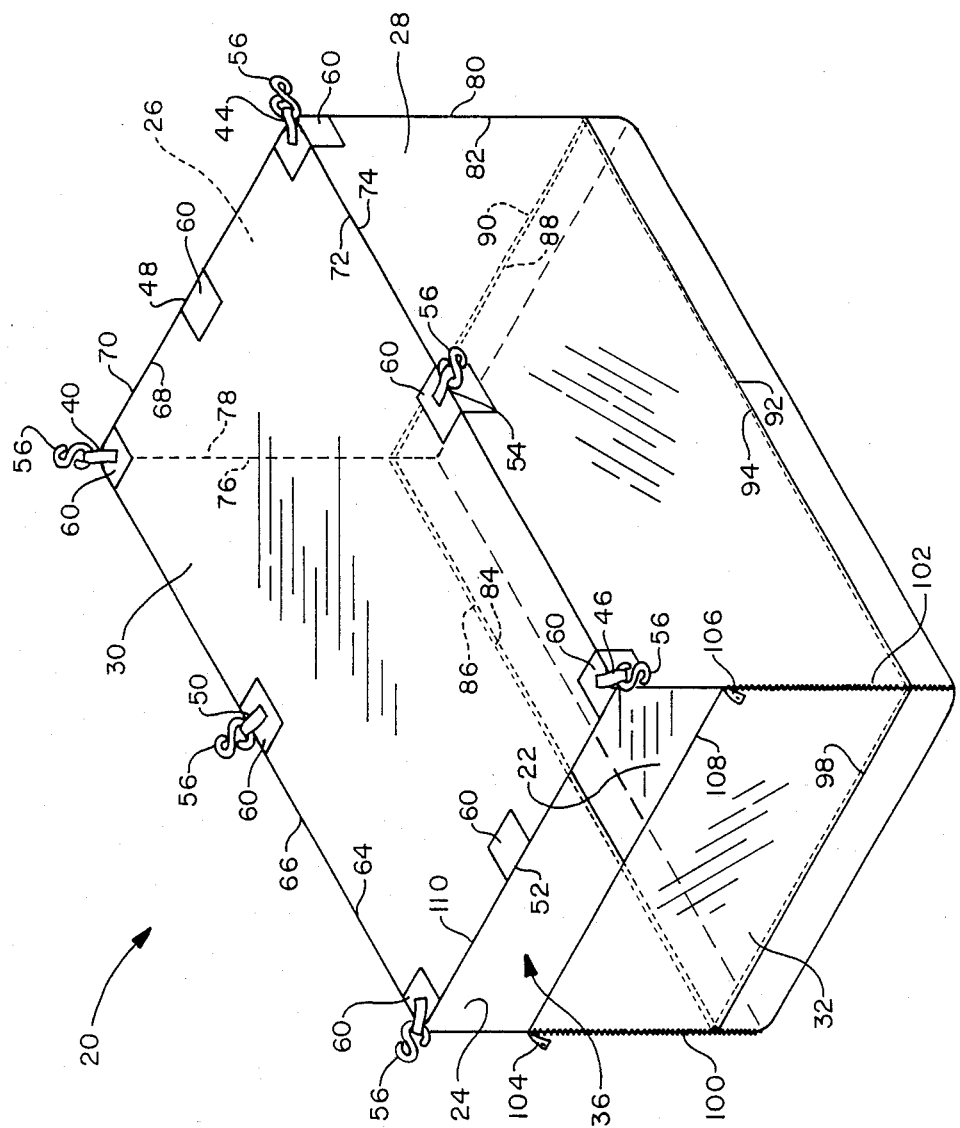
FIG. 3 is a perspective view of the liner with the gate being secured to the floor, left wall, and right wall.

In one embodiment, as shown in FIG. 1, roof 30, left wall 24, front wall 26, right wall 28, and floor 22 are cut into separate pieces or elements and joined together by seams. Roof 30 serves as an interior tarp or ceiling, being appropriately dimensioned to cover and protect a desired area of the ceiling of the vehicle. As shown in FIG. 3, roof 30 spans between opening 36 and front wall 26, and between left wall 24 and right wall 28. Roof 30 is tied or fastened to interior framework 38 in such a manner that roof 30 is taut, raising the center of roof 30 and reducing its obstruction during use.

Figure 4:
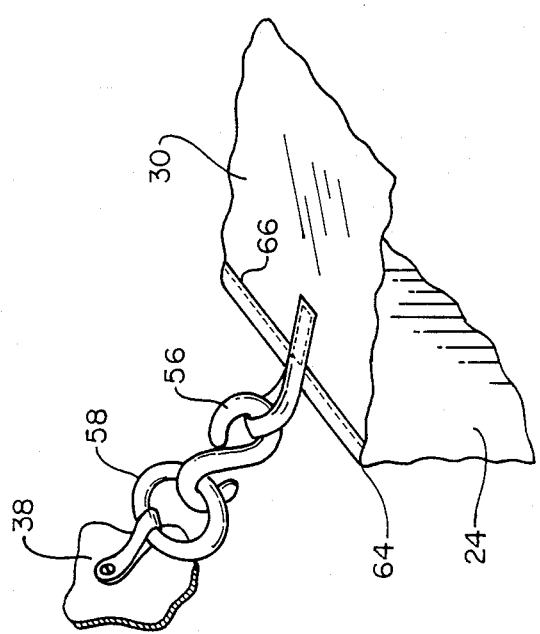
FIG. 4 is a partial perspective view of a liner fastener and vehicle fastener securing the liner to the framework of the vehicle.

In the preferred embodiment, as shown in FIG. 4, fasteners 58 are attached to interior framework 38 along the perimeter of the vehicle's ceiling. Corresponding fasteners 56 are attached to liner 20 along the perimeter of roof 30. Fasteners 56 and 58 enable liner 20 to be quickly and easily attached and removed from the vehicle. Left wall 24 and right wall 28 may also be appropriately tied or fastened to interior framework 38.

Tension bands 62, shown in FIG. 1, may also be sewn across the breadth of roof 30 to provide added support to roof 30. Fasteners 56 may be attached to the ends of tension bands 62 to enable tension bands 62 to support roof 30.

A variety of fasteners 56 and 58 may be used. Fasteners 56 and 58 are shown in FIG. 4, and are omitted in FIG. 2. Lengths of cords, webbing, pullouts, tie loops, twill tape, S-hooks, hook and loop fasteners, or other kinds of fasteners may be attached to corners 40, 42, 44, and 46 and/or to other locations along the perimeter of roof 30, such as along the seams or seam lines between roof 30 and left wall 24, front wall 26, and right wall 28. If lengths of webbing, called "stays", are used, the webbing may be lengthened or shortened to easily change the tension exerted on liner 20 and tighten or loosen the fabric forming roof 30. Wood, metal, or plastic stay fasteners may g also be used. Use of multiple fasteners 58 enable the erection of only a portion of liner 20, for example only half of the length of liner 20, thereby reducing the cargo area within liner 20. This enables liner 20 to be used in a vehicle having a middle seat.

In the preferred embodiment, fasteners 58 are rings which are attached to the vehicle with screws and tie wraps. Fasteners 56 are corresponding hooks sewn onto liner 20 with webbing at corners 40, 42, 44, and 46, and at midsection points 48, 50, 52, and 54. If the vehicle has lift bars, door hinges, shock bumpers, or similar protrusions, liner 20 may be attached to the vehicle at such points.

Reinforcement elements 60, shown in FIG. 3, may be used to prevent liner 20 from tearing or ripping when tension is placed on fasteners 56. Double or triple layers of fabric or other material may be attached to liner 20 at corners 40, 42, 44, and 46, and at midsection points 48, 50, 52, and 54 for this purpose In the preferred embodiment, reinforcement elements 60 are about 4-inches square. If very durable materials are used in the construction of liner 20, reinforcement may not be necessary.

Left wall 24, front wall 26, and right wall 28 form the sides or walls of liner 20 which reach from roof 30 to floor 22. Left wall 24, front wall 26, and right wall 28 function similarly to wall curtains, hanging limply from the seams or seam lines on three sides of liner 20 about the perimeter or roof 30. Left edge 64 of roof 30 is attached to top edge 66 of left wall 24. Front edge 68 of roof 30 is attached to top edge 70 of front wall 26. Right edge 72 of roof 30 is attached to top edge 74 of right wall 28.

Left wall 24 and right wall 28 are basically identical. Left wall 24 is appropriately dimensioned to cover and protect a desired area of a left interior wall of the vehicle. Left wall 24 spans between opening 36 and front wall 26. Front edge 76 of left wall 24 is attached to left edge 78 of front wall 26. Right wall 28 is appropriately dimensioned to cover and protect a desired area of a right interior wall of the vehicle. Right wall 28 spans between opening 36 and front wall 26. Front edge 80 of right wall 28 is attached to right edge 82 of front wall 26. Front wall 26 spans the distance between left wall 24 and right wall 28.

Where the vehicle is a van having removable rear and middle seats, front wall 26 restricts or prevents the contents of liner 20 from entering the driving area or cockpit of the vehicle. Front wall 26 also covers and protects the backs of the front seats of the vehicle.

Floor 22 is generally about the same size and shape as roof 30. Floor 22 may be appropriately dimensioned such that the seams about the perimeter of floor 22 rest upon or meet the bed of the vehicle. Floor 22 lies directly upon the desired area of the vehicle bed to cover and protect the vehicle bed from becoming soiled, wetted, or damaged. Left edge 84 of floor 22 is attached to lower edge 86 of left wall 24. Front edge 88 of floor 22 is attached to lower edge 90 of front wall 26. Right edge 92 of floor 22 is attached to lower edge 94 of right wall 28. Floor 22 may be made of the same material as the other elements of liner 20, or floor 22 may be made of a more durable, tear-resistant material.

In the preferred embodiment, however, as shown in FIGS. 1–3, floor 22 is slightly larger than roof 30, thereby enabling portions of the floor material to extend part way up left wall 24, front wall 26, and right wall 28. Portions of floor 22 extend part way up the side and front walls of liner 20 forming a three-sided "bathtub" formation. This construction reduces possible damage due to abrasion which may otherwise occur seams which attach floor 22 to the walls of liner 20. If waterproof materials are used, this design enables floor 22 to contain any small liquid spills which may occur within the cargo space of liner 20. The seams may also be sealed to prevent liquid from seeping through them. This design also allows liner 20 to be easily swept and cleaned, because the seams which join floor 22 to the walls of liner 20 are located slightly above the perimeter of the vehicle bed area.

Where one continuous piece of fabric or material is used to from a plurality of the elements of liner 20, costs of manufacturing may be reduced. This is due to a reduction in the number of seams required to practice the invention. One continuous piece of fabric may be used to form left wall 24, roof 30, and right wall 28. Separate pieces of fabric or material which define front wall 26, and floor 22 may be appropriately sewn or joined to left wall 24, roof 30, and right wall 28. Alternatively, front wall 26, floor 22, and possibly gate 32 may be formed from another continuous piece of fabric. The two pieces of fabric are then joined to form liner 20.

The pieces may be bound or attached together at their seams by overlapping the desired edges of the pieces or elements and gluing, sewing, stitching, or otherwise joining the pieces together Preferably, double-stitched, flat-felled seams having about a 1 to 1½ inch overlap are used. Such seams are very strong and durable. Stitching should be even and without puckers, crooked seams or large needle holes. The stitching should have from about 6 to 12 stitches per inch. Several other kinds of seams such as a surged seam may also be used.

Where the vehicle is a truck or van having a rear door or gate, opening 36 may be located near the aft portion of the vehicle. Other or alternative openings, which allow additional access to the interior cargo space of liner 20, may also be used where appropriate. If desired, vents may be incorporated into liner 20 to allow warm air, steam, or other gases to escape to outside atmosphere from within the cargo area of liner 20. Transparent, semi-transparent, or translucent windows may also be sewn into liner 20 if desired. Screening materials, such as fiber-glass screen, may also be used for the vents, windows, or other openings.

Liner 20 may be built with a rugged threshold area or fold-down doorsill 96 located near opening 36 to allow for easy cleaning and to prevent tearing of floor 22 during use. As shown in FIG. 2, doorsill 96 may fold down allowing the cargo area of liner 20 to be easily swept out.

A door, door-flap, tongue, or gate 32 may also be permanently or removably attached to rear edge 98 of floor 22 along the threshold area of opening 36. Gate 32 enables the partial or complete closure of opening 36. Gate 32 allows for easy venting and access to the cargo area located within liner 20. Gate 32 may also be removably attached to rear edge 100 of left wall 24 and to rear edge 102 of right wall 28. Such attachment may be achieved by using heavy-duty zippers, ties, hook and loop fasteners, or other types of fasteners. In the preferred embodiment, locking, double handled zippers 104 and 106 are used. Zippers 104 and 106 should be double stitched and bar-tacked at their ends. Zipper stiffeners may be used to help prevent zippers 104 and 106 from catching or tearing on the liner fabric.

Zippers 104 and 106 enable gate 32 to be adjustably raised and lowered to serve as a tailgate at any desired height. When gate 32 is fully raised or closed, gate 32 protect the rear door of the vehicle. When detached from left wall 24 and right wall 28, gate 32 extends over the threshold and bumper of the vehicle. About a 1 to 1½ inch hem should be glued or sewn along upper edge 108 of gate 32.

A fastener 110, such as a hook and loop fastener, may be attached to gate 32 along upper edge 108. When gate 32 is lowered or detached from walls 24 and 28, gate 32 may be folded under, and fastener 110 secured as shown in FIG. 2. Such attachment prevents the outer side of gate 32 from getting soiled or possibly burnt by the tail pipe of the vehicle.

In addition, or as an alternative, to the use of gate 32, a rear cover 34 may be attached with zippers, ties, hook and loop fasteners, or other types of fasteners, to rear edges 100 and 102, and to rear edge 110 of roof 30. Rear cover 34 may also be attached to upper edge 108 when gate 32 is raised and secured to left wall 24 and right wall 28. Rear cover 34 may be used to linear substantially seal the load, dust, dirt, and odor within 20, thereby protecting the vehicle's interior from being soiled or absorbing odors. Rear cover 34 may also be used to provide privacy for the contents of the cargo space within liner 20. Rear cover 34 may be detached from liner 20 so as not to obstruct opening 36 during the loading and unloading of the cargo area.

If appropriately secured, rear cover 34 may also serve as a canopy-flap, awning, rainfly, or storm flap to repel moisture or dust while the cargo area is being filled emptied. If the vehicle has an upper-hinged rear door, such door may serve as the rainfly to shed rainfall and prevent the interior area of liner 20 from becoming wet.

Liner 20 may be erected quickly and easily, requiring few fasteners 56. For vehicles having removable seats, such as vans or minivans, the seats are removed before liner 20 is attached to the vehicle. During installation, liner 20 is unfolded and appropriately spread out on the bed of the vehicle. Fasteners 56 are then raised and attached to corresponding fasteners 58. When attached to the vehicle, roof 30 should be stretched fairly smooth or taut so that roof 30 will not "saddleback" or dip down to become an obstacle during use of liner 20.

To remove liner 20, fasteners 56 are detached from fasteners 58. Liner 20 may then be removed from the vehicle to be washed, shaken, folded, rolled, and bundled into a neat, tight, compact size for storage in the cargo area or beneath a seat in the vehicle where it will be readily available when the need for its use arises. When so folded and bundled, liner 20 may be easily carried from place to place without taking up very much room.

INDUSTRIAL APPLICABILITY

This invention is particularly well adapted for covering and protecting the interior surfaces of an enclosed or partially enclosed cargo area of a vehicle. The present invention serves as an interior liner for the vehicle. The liner has a floor, walls, a roof, and a gate and/or a rear cover. An opening is provided at the one end of the liner to allow easy access to the interior cargo area located within the liner.

I claim:

1. A liner apparatus for covering and protecting a bed, a left and a right interior wall, a ceiling, a door, a threshold, and a bumper of a completely or partially enclosed cargo area of a vehicle, comprising:
   (a) a floor appropriately dimensioned sit upon, cover, and protect a desired area of said bed;
   (b) a left wall appropriately dimensioned to cover and protect a desired area of said left interior wall, said left wall being attached to said floor;
   (c) a right wall appropriately dimensioned to cover and protect a desired area of said right interior wall, said right wall being attached to said floor;
   (d) a front wall appropriately dimensioned to enclose a front end of said apparatus, said front wall being attached to said floor, said left wall, and said right wall;
   (e) a roof appropriately dimensioned to cover and protect a desired area of said ceiling, said roof being attached to said front, right and left walls; and
   (f) a gate attached to said floor, said gate being adjustably and removably secured to said left wall and to said right wall, said gate being capable of being adjustably raised or lowered, said gate serving as a tailgate having an adjustable height when raised and secured to said left wall and to said right wall, said gate at least partially losing an opening in said apparatus when said gate is raised, said liner supporting said gate at said adjustable height, said gate at least partially covering and protecting said threshold and said bumper when said gate is lowered.

2. The apparatus of claim 1 further comprising at least one liner fastener, said liner fastener being attached to said apparatus along a perimeter of said roof, said liner fastener permitting said apparatus to be easily attached to or removed from an interior framework of said vehicle, said interior framework providing structural integrity to said apparatus during use.

3. The apparatus of claim 2, further comprising at least one vehicle fastener, said vehicle fastener being attached to said vehicle, said vehicle fastener having a loop or a ring, said liner fastener having an S-hook which engages said loop or ring of said vehicle fastener.

4. The apparatus of claim 1, wherein said apparatus is made of nylon/polyethylene materials that are durable, tear-resistant, and water-resistant.

5. The apparatus of claim 1, wherein said gate is removably attached to said left wall and to said right wall by means of a zipper, said zipper allowing said gate to be adjustably raised or lowered.

6. The apparatus of claim 2, wherein a plurality of said liner fasteners are provided, use of a limited number of said liner fasteners allowing erection of a limited portion of said apparatus within a designated portion of said cargo area.

7. The apparatus of claim 3, wherein said vehicle fastener is attached to said vehicle by means of a tie wrap or a screw.

8. The apparatus of claim 3, wherein said vehicle fastener is attached to a protrusion of said vehicle.

9. The apparatus of claim 1, further comprising a rear cover attached to said roof, said rear cover serving as a canopy-flap, awning, rainfly, or storm flap for said apparatus to repel moisture or dust from entering said cargo area, said rear cover being removably secured to said left wall and to said right wall of said apparatus.

10. The apparatus of claim 2, further comprising at least one tension band spanning a breadth of said roof to provide additional support to said roof, said vehicle fastener being attached to each end of said tension band.

11. The apparatus of claim 1, wherein said apparatus is treated with a flame-retardant or flame-resistant substance.

12. An apparatus for protecting interior surfaces of a cargo area of a vehicle having a cargo area threshold, comprising:
   (a) a liner formed from a flexible sheet material disposed within said cargo area, said liner having a generally parallelpiped configuration including at least one open end through which said liner may be entered, said liner having a gate positioned near said open end, said gate being capable of laying over and protecting said cargo area threshold, said gate being adjustably secured to said liner near said open end, said gate having an adjustable height for closing or partially closing said open end, said liner supporting said gate at said adjustable height; and
   (b) supporting means for attaching said liner to said vehicle, said supporting means having a plurality of fasteners positioned between said liner and said vehicle for suspending said liner in an open position within said cargo area of said vehicle.

13. The apparatus of claim 12, wherein said gate is designed to serve as a tailgate having a securable and adjustable height to close a portion of said open end of said liner.

14. The apparatus of claim 12, wherein said liner is made of nylon/polyethylene materials which are durable, tear-resistant, and water-resistant.

* * * * *